United States Patent [19]

Manning et al.

[11] Patent Number: 5,507,477
[45] Date of Patent: Apr. 16, 1996

[54] COMPOSITE DAMPING STRUCTURES AND RELATED METHOD

[75] Inventors: Raymund A. Manning, Long Beach; Allen J. Bronowicki, Laguna Niguel, both of Calif.

[73] Assignee: TRW Inc., Redondo Beach, Calif.

[21] Appl. No.: 282,394

[22] Filed: Jul. 28, 1994

[51] Int. Cl.⁶ .................................................... F16F 7/10
[52] U.S. Cl. .................... 267/140.3; 267/141; 188/378; 428/36.4; 428/36.8; 428/113
[58] Field of Search ............................ 267/136, 140.11, 267/140.12, 140.3, 140.5, 141, 141.2, 152, 153, 291–294; 188/268, 378–380; 428/36.4, 36.8, 48, 49, 113, 295, 902

[56] References Cited

U.S. PATENT DOCUMENTS

| | | | |
|---|---|---|---|
| 2,270,902 | 1/1942 | Rubissow | 267/141 |
| 2,697,578 | 12/1954 | Whittam | 248/358 |
| 3,160,549 | 12/1964 | Caldwell et al. | 267/141 X |
| 3,924,907 | 12/1975 | Czernik et al. | 308/3 |
| 4,195,713 | 4/1980 | Hagbjer et al. | 188/1 B |
| 4,278,726 | 7/1981 | Wieme | 428/229 |
| 4,527,371 | 7/1985 | Hagbjer | 52/309.16 |
| 4,593,889 | 6/1986 | Odobasic | 267/57.1 |
| 4,995,630 | 2/1991 | Piegay | 280/602 |
| 5,030,490 | 7/1991 | Bronowicki et al. | 428/364 |
| 5,087,491 | 2/1992 | Barrett | 428/34.5 |
| 5,090,668 | 2/1992 | Hamada | 267/141 |
| 5,108,802 | 4/1992 | Sattinger | 428/34.1 |
| 5,112,144 | 5/1992 | Law | 384/215 |
| 5,161,655 | 11/1992 | Shimoda | 188/371 |
| 5,232,073 | 8/1993 | Bronowicki et al. | 188/378 |
| 5,250,132 | 10/1993 | Lapp et al. | 156/173 |
| 5,256,223 | 10/1993 | Alberts et al. | 156/71 |
| 5,271,142 | 12/1993 | Moore et al. | 29/469.5 |
| 5,308,675 | 5/1994 | Crane et al. | 428/120 |
| 5,330,165 | 7/1994 | van Goubergen | 267/141 |

FOREIGN PATENT DOCUMENTS

| | | | |
|---|---|---|---|
| 0011941 | 1/1990 | Japan | 267/140.3 |
| 9001645 | 2/1990 | WIPO | 267/140.3 |

Primary Examiner—Robert J. Oberleitner
Assistant Examiner—Peter M. Poon

[57] ABSTRACT

A composite structure of elastic and viscoelastic components in which dynamic loads are effectively damped by repeated transmission through viscoelastic layers. Multiple viscoelastic layers and stiff segmented elastic layers are formed on the outside of a tubular layer of soft elastic material, to provide the damping effect without having to form additional layers inside the tubular layer of soft elastic material. The transition temperatures above which the viscoelastic layers become substantially less stiff may be selected to be different for each layer, to provide increased damping efficiency over a broadened operative temperature range.

8 Claims, 2 Drawing Sheets

COMPOSITE DAMPING STRUCTURES AND RELATED METHOD

BACKGROUND OF THE INVENTION

This invention relates generally to damped mechanical structures and methods of their manufacture and, more particularly, to damped structures employing viscoelastic materials. There are a number of applications of mechanical structures in which there is a requirement to damp out oscillations caused by varying mechanical loads, either axial loads, bending and shear loads, or torsional loads. A particularly important category of applications includes structures for use in aerospace vehicles. In these applications, there are three major requirements: stiffness, lightness in weight, and the ability to absorb energy by damping any oscillations that would otherwise be present. Fiber composite materials can easily satisfy the stiffness and weight requirements, but the design of an appropriate self-damping structure is more difficult to achieve.

Viscoelastic materials offer an efficient means of dissipating energy. Although these materials have poor stiffness, they provide an energy dissipative effect in direct proportion to the elastic force applied to them. Since a viscoelastic material is soft, it is typically made in thin layers and held between constraining layers of stiffer elastic materials. Relative motion of the elastic layers induces a shear load in the viscoelastic material and thereby dissipates energy. This is known as constrained layer damping, and is generally limited to damping flexural motions of the base member. The constraining layer acts through the viscoelastic layer to produce a dynamic stiffness in parallel to the elastic stiffness of the base member.

Another prior approach to viscoelastic damping is series damping. In a series damper, the entire load in a member is made to pass as a shear load through the viscoelastic material. This allows the dissipation of a large amount of energy, but no parallel elastic load path is provided through the viscoelastic material. Also, failures can often occur in series damping viscoelastic materials, and surface sealing of the materials can be difficult. Sealing is important because many viscoelastic materials are inherently unstable and, if not sealed from exposure to the environment, will "outgas" vapors from their surface. This process not only degrades the desirable elastomeric properties, but also contaminates other materials in the near vicinity. Accordingly, a sealing layer is usually provided over viscoelastic materials, to minimize exposure to sunlight and oxygen.

A variation of the constrained layer approach is to employ a segmented constraining layer, allowing both extensional and flexural motions to be damped. This is discussed in "Constrained Layer Damping Effectiveness of Members under Vibratory Extensional Loadings," by Stanley S. Sattinger, presented at the ASME Design Engineering Conference in Cincinnati, Ohio, 1985, paper no. 85-DET-134. The segmented constraint can dissipate only a limited amount of energy, as the underlying elastic structure will always carry a significant portion of the load.

A good solution to the difficulties posed by the prior art was proposed in U.S. Pat. No. 5,030,490, entitled "Viscoelastic Damping Structures and Related Manufacturing Method," issued in the names of Allen J. Bronowicki and Abner Kalan. The invention disclosed and claimed in the aforementioned patent resides in a composite structure of viscoelastic and elastic materials, in which dynamic loads are directed along a path that passes repeatedly through a viscoelastic layer, to maximize damping in the structure. Although the tubular form of the structure provides significantly improved viscoelastic damping properties for various types of dynamic loads, it has the disadvantage of having an internal viscoelastic layer, which adds to manufacturing difficulties. The present invention is an improvement over the structure disclosed in the aforementioned patent.

SUMMARY OF THE INVENTION

The present invention resides in a viscoelastic damping structure and a related method. Briefly, and in general terms, the structure of the invention comprises an inner layer of relatively soft elastic material; a first viscoelastic layer, overlying the inner layer; a first relatively stiff segmented elastic layer overlying the first viscoelastic layer; a second viscoelastic layer overlying the first segmented elastic layer; and a second relatively stiff segmented elastic layer overlying the second viscoelastic layer. Manufacture of the structure is simplified by eliminating the need for forming layers inside the inner layer of relatively soft elastic material. Dynamic loads in the structure tend to be conducted back and forth through the segmented elastic layers and the viscoelastic layers, for an enhanced damping effect.

Preferably, the first and second relatively stiff segmented elastic layers have segments that are staggered or overlapped with respect to each other, to divert dynamic loads back and forth between these two layers, through the intervening second viscoelastic layer. Each of the first and second viscoelastic layers is preferably, but not necessarily, continuous.

In accordance with another aspect of the invention, the first and second viscoelastic layers are selected to have different transition temperatures, above which they provide substantially reduced stiffness, to provide increased damping efficiency over a broadened operative temperature range. Specifically, the first or inner viscoelastic layer has a higher transition temperature than the second, or outer, viscoelastic layer, to transfer load through the entire operative temperature range. The second viscoelastic layer, having a lower transition temperature than the first, dissipates vibrations at the lower end of the operative temperature range. In one illustrative embodiment, the first viscoelastic layer has a transition temperature of approximately 30° C. and the second viscoelastic layer has a transition temperature of approximately 0° C.

The invention may also be expressed as a method for fabricating a tubular viscoelastic damping structure, comprising the steps of forming a first viscoelastic layer over a tube of relatively soft elastic material; forming a first segmented stiff elastic layer over the first viscoelastic layer; forming a second viscoelastic layer over the first segmented stiff elastic layer; and forming a second segmented stiff elastic layer over the second viscoelastic layer. This manufacturing method is much more simple than the corresponding method steps needed when layers have to be formed internally with respect to a tubular layer.

The invention may also be expressed as a process for damping dynamic loads in a viscoelastic structure including an inner tube of relatively soft elastic material, two segmented elastic layers of material of high stiffness and strength in a desired loading direction, formed outside the inner tube, and at least one continuous layer of viscoelastic material having low stiffness and strength in the desired loading direction, also formed outside the tube. The method comprises the steps of applying a dynamic load to the structure in the desired loading direction; conducting the dynamic load forces generally in the direction of loading, and back and forth between the two segmented elastic layers and through the at least one layer of viscoelastic material; dissipating dynamic load energy in the at least one viscoelastic layer material as a result of conducting the load forces repeatedly through the viscoelastic layer material; and providing at least one path for the conduction of static loads in the desired loading direction.

It will be appreciated from the foregoing summary that the present invention represents a significant improvement in the field of-damped mechanical structures and related methods. In particular, the invention provides a tubular viscoelastic structure for damping dynamic loads without having to form viscoelastic or elastic layers inside the tubular structure. Other aspects and advantages of the invention will become apparent from the following more detailed description, taken in conjunction with the accompanying drawings.

DESCRIPTION OF THE PREFERRED EMBODIMENT

Figure 1:
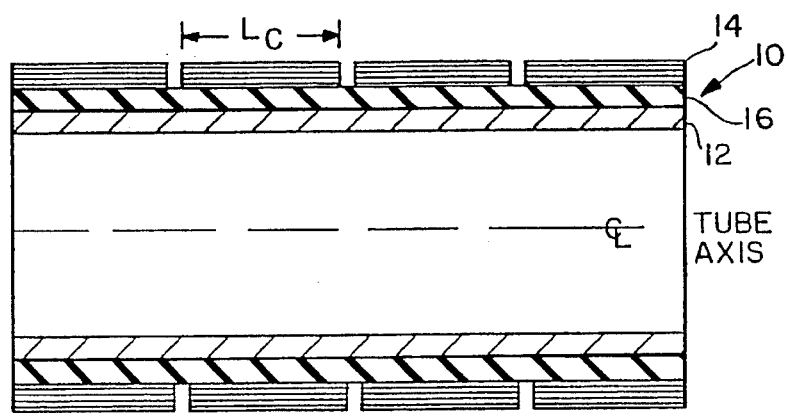
FIG. 1 is a fragmentary cross-sectional view of a tubular viscoelastic structure of the prior art.

As shown in the drawings for purpose of illustration, the present invention is concerned with damping structures using viscoelastic or similar materials. Damping structures are useful in a variety of applications, but particularly in aircraft and spacecraft, which typically must be light in weight, strong and rigid enough to support static loads, and able to absorb energy from dynamic loads of various types.

Viscoelastic polymers have mechanical damping properties that vary with the frequency of dynamically applied load, and also vary with temperature. In simple terms, these materials exhibit greater stiffness when a mechanical load is applied to them at a greater frequency. For static or slowly varying loads, the materials are soft and tend to "creep" under the application of load. Viscoelastic materials are ideal components in mechanical structures that are subject to vibrational loads, which may be extensional or shear loads. If the loads can be directed into the viscoelastic materials, the increased stiffness provided will dissipate energy and effectively damp the vibrations. A major difficulty is to design a structure with an appropriate combination of viscoelastic material and conventional elastic material. Since viscoelastic materials are virtually incapable of supporting a static load, a static load path must be provided through conventional elastic materials.

FIG. 1 illustrates one approach of the prior art, as used in a tubular structural element, indicated by reference numeral 10, subject to axial loading. The tubular element 10 includes three concentric layers: an inner layer 12, a segmented outer constraint layer 14, and an intermediate layer 16 of viscoelastic material. The inner and outer layers 12 and 14 are of conventional elastic materials, which deform elastically in response to an applied load, in a uniform and usually linear manner.

The following comments concerning the selection of elastic and viscoelastic materials apply both to the present invention and to prior art structures such as the one shown in FIG. 1. In the type of lightweight aerospace structures to which the invention may be usefully applied, these elastic materials consist of fibers bound together by a matrix. The fibers may be, for example, graphite, fiberglass, boron, or Kevlar. Graphite fibers include pitch based materials designated, for example, P-75, P-100, and P-120, and PAN based materials designated, for example, GY-70 and T300. Glass fibers include S-glass and E-glass. Plastic materials may be an epoxy, such as Fiberite 934, or a thermoplastic resin, such as PEEK (poly-etheroether-ketone). In the case of graphite fiber reinforced plastics, the matrix materials have only minor influence on the mechanical properties of the elastic components, and the fibers carry 95% or more of the mechanical load. In the case of glass fiber reinforced plastics, the glass fibers are so soft that the matrix material contributes a considerable proportion of the stiffness. A metal matrix may also be used, such as aluminum, copper or magnesium. For metal matrix composites the metal binding the fibers adds considerable stiffness and strength, both parallel to and transverse to the fibers.

The fibers of the elastic materials may be laid in any desired orientation, or in a suitable mix of orientations. Since the fibers are largely responsible for the conduction of load through the materials, the selection of orientation is an important factor in the design of the structure. A "normal" layup of an elastic component of this type includes a mix of fibers laid in different orientations, so that the material has desired stiffness and strength in two directions in the plane of the material. Stiffness and strength can dominate in a preferred direction, but must also be provided to a degree in the transverse direction. In the tubular structure of the prior art shown in FIG. 1, the inner layer 12 is of a material of such a normal layup. On the other hand, the outer segmented layer 14 has fibers aligned only in the axial direction, as indicated in the drawing by the shading of this layer. The outer layer 14 is, therefore, capable of transferring loads only in the axial direction. When subjected to transverse shear forces, as in the transmission of a torsional load, the outer layer 14 provides little, if any, stiffness or strength.

The viscoelastic material in layer 16 may be selected from various rubbers or plastics, such as PVC (polyvinyl chloride); adhesives, such as Scotchdamp ISD-110, -112 or -113 polymers manufactured by the 3M Company, St. Paul, Minn.; or silicones, such as Densil, manufactured by Flexcon, Inc. The material and its thickness are chosen for optimum operation at the expected temperature and frequency of vibration.

The structure of FIG. 1 transmits static axial loads primarily through the inner elastic layer 12, since the viscoelastic layer 16 will transmit little, if any, static load and the outer layer is axially discontinuous. Under dynamic loading, however, the viscoelastic layer 16 becomes stiffer and, although some of the load will continue to be transmitted through the inner layer 12, a substantial proportion of the load will be transmitted alternately by the viscoelastic layer 16 and segments of the outer layer 14. Because the outer layer 14 is segmented, axially transmitted loads are forced to take a path through the viscoelastic layer 16, which provides a desired damping effect. Although this arrangement produces damping, it still leaves an unimpeded, and undamped, load path through the inner elastic layer 12.

Figure 2:
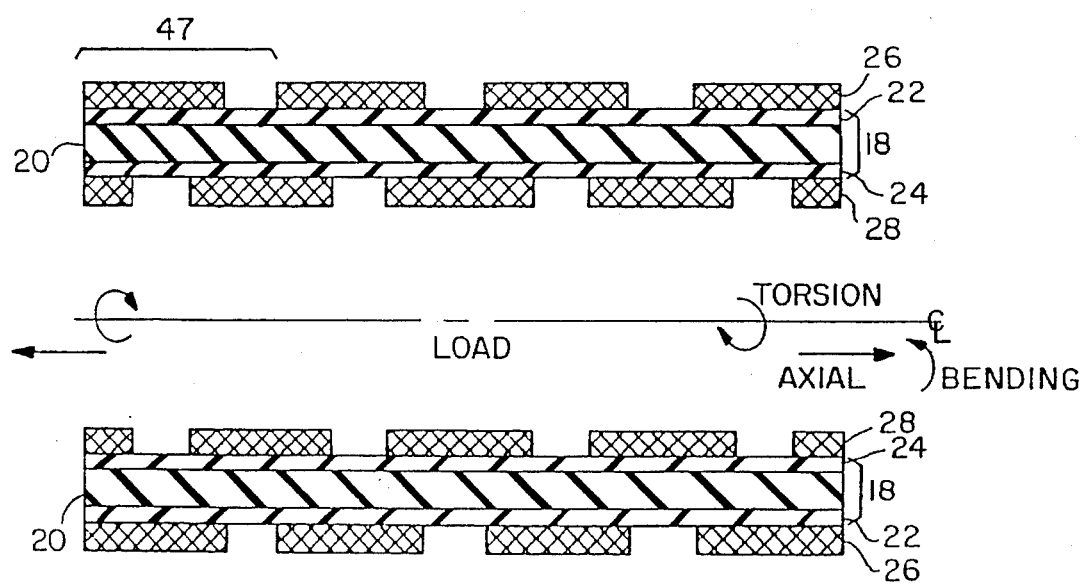
FIG. 2 is a cross-sectional view of another tubular viscoelastic structure of the prior art, as disclosed in the aforementioned patent.

The structure illustrated in FIG. 2 includes a sandwich portion 18 made up of a soft first elastic core layer 20, contiguous to viscoelastic layers 22 and 24, one of each side of the layer 20, and segmented outer and inner stiff second elastic layers 26 and 28. If the soft elastic layer 20 is significantly more flexible than the stiff elastic layers in both extensional and shear deformations, the circumstance will result in axial, bending and torsional vibratory deformations in the tubular structure all being damped. Any load applied to the soft elastic layer 20 will encounter alternately stiff material in the segmented layers 26, 28. Loads are transmitted alternately between the soft elastic layer 20, through viscoelastic layer 22, to the soft elastic layer 20, then through the viscoelastic layer 24, to the segmented layer 26. An important feature is that the segments of layers 26, 28 are overlapped or staggered, such that any gap in one of the segmented layers is not radially aligned with a gap in the other segmented layer. This staggering of the stiff segments on opposite sides of the sandwich portion 18, which is more flexible than layers 26, 28, serves to amplify dynamic load transmission through the viscoelastic material. One may notice that the viscoelastic layers 22, 24 are exposed to the environment in the gaps between the segmented layers 26, 28, and that thin sealing layers, as hereinafter described, should be added to avoid this exposure.

Under conditions of static loading the tube of FIG. 2, there is provided a load path parallel to the dynamic load path through the segmented elastic layers 26 and 28. A static load, such as an axial, bending, shear or torsional load, will be transmitted directly through the continuous soft elastic layer 20. Neither the viscoelastic layers 22, 24 nor the segmented elastic layers 26, 28 contribute to static stiffness. In dynamic loading, a small proportion of the load is carried along this path, but because the viscoelastic material of layers 22, 24 exhibits increased stiffness, a large proportion of the load is transmitted back and forth from one segmented elastic layer 26, 28 to the other, through the intervening viscoelastic layers 22, 24 and the soft, first elastic layer 20. Because the bulk of the load is forced through the viscoelastic layers 22, 24, the damping effect of this material is fully utilized and the desired damping of vibrational loads is achieved.

Although the embodiment of FIG. 2 provides a good solution to the problems of the prior art as represented by FIG. 1, practical manufacturing difficulties are posed by the need to form the viscoelastic layer 24 and the elastic layer 28 inside the tube 20 of elastic material. The present invention avoids these difficulties, and provides a structure with even better damping characteristics.

Figure 3:
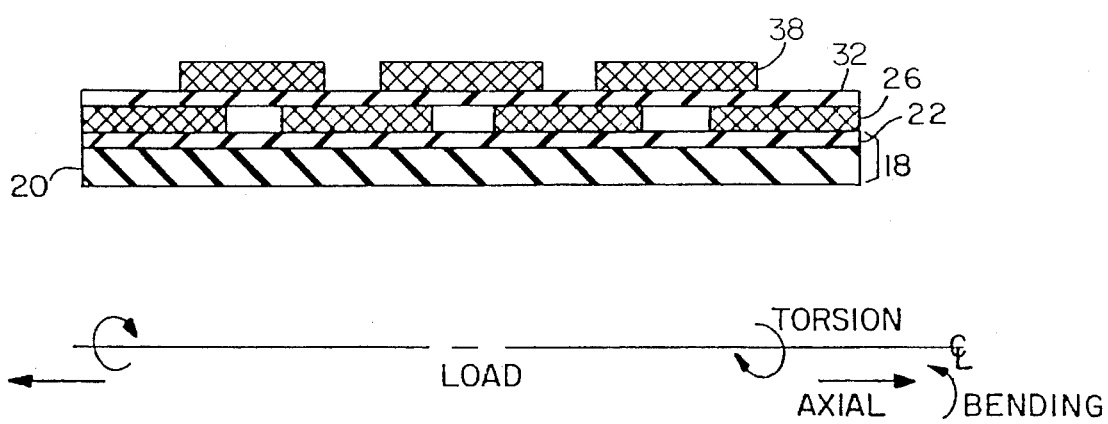
FIG. 3 is a cross-sectional view of a tubular viscoelastic structure in accordance with the present invention.
Figure 3:
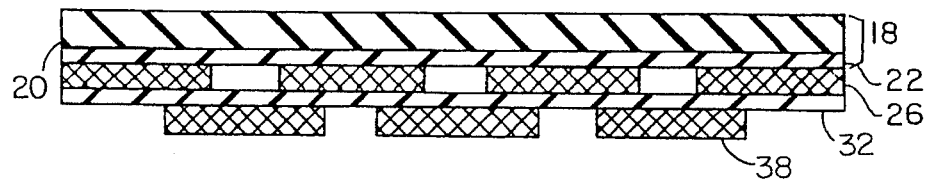

As shown in FIG. 3, the structure of the invention includes a soft elastic layer 20 on the outer surface of which is formed a viscoelastic layer 22. Succeeding outer layers include a segmented stiff elastic layer 26, an additional viscoelastic layer 32, and another segmented stiff elastic layer 38. The segments of the stiff elastic layers 26 and 38 are staggered, similarly to the layers 26 and 28 in FIG. 2. The addition of the viscoelastic layer 32 and the stiff elastic layer 38 tends to funnel more dynamic load into the viscoelastic layers 22 and 32, thus providing better damping characteristics. Because the dynamic load can weave its way from the stiff elastic layer 26 through the viscoelastic layer 32 to the other stiff elastic layer 32, little dynamic load needs to pass through the soft elastic layer 20. Thus, less strain energy is stored in the elastic layer 20 and more is stored in the viscoelastic layers 22 and 32, leading to higher levels of damping than may be achieved using the approach of FIG. 2.

The viscoelastic layers 22 and 32 may or may not be continuous, whereas the stiff elastic layers 22 and 32 cannot be continuous and are preferably staggered or overlapped as shown, to provide for repeated transfers for load back and forth between the two stiff elastic layers, through the viscoelastic layer 32. By eliminating the need to form viscoelastic and elastic layers internally in the tube 20, the invention greatly simplifies and speeds up the fabrication process.

It is possible to extend the operative temperature range of the damping treatment by employing different viscoelastic materials for the inner (22) and outer (32) constrained layers. The inner layer 22 is chosen to have the higher transition temperature, so that it will remain stiffer than the outer layer 32, and thus transfer load through the entire operative temperature range. The transition temperature is the temperature above which a viscoelastic material ceases to provide stiffness. For example, the 3M Company's Scotchdamp polymer designated ISD-110, which has a transition temperature of 30° C. at a 2 Hertz vibration, could be employed as the inner layer 22. The outer layer 32 preferably is of a viscoelastic material having a lower transition temperature, so that vibrations could be dissipated at the lower end of the operative temperature range. For example, the 3M Company Scotchdamp polymer material designated ISD-112, having a transition temperature of 0° C. at 2 Hertz, could be employed. Using this approach, with multiple viscoelastic layers having different temperature operating ranges, the invention allows for increased damping efficiency over a broadened temperature range. For the example presented, 2 Hertz vibrations can be damped to 3% or greater over the temperature range of 0°–30° C. (30°–80° F.).

It will be appreciated from the foregoing that the present invention represents a significant advance in the field of damping mechanical structures. In particular, the invention provides improved viscoelastic damping characteristics for various types of dynamically loads, in a tubular structure in which no additional elastic or viscoelastic layers have to be formed internally. It will also be appreciated that, although a specific embodiment of the invention has been described for purposes of illustration, various modifications may be made without departing from the spirit and scope of the invention. Therefore, the invention should not be limited except as by the appended claims.

We claim:

1. A tubular viscoelastic damping structure, comprising:

an inner tubular layer of relatively soft elastic material;

a first viscoelastic layer, overlying the inner layer;

a first relatively stiff segmented elastic layer overlying the first viscoelastic layer;

a second viscoelastic layer overlying the first segmented elastic layer; and a second relatively stiff segmented elastic layer overlying the second viscoelastic layer;

whereby manufacturing is simplified by eliminating the need for forming layers inside the tubular inner layer of relatively soft elastic material, and whereby dynamic loads tend to be conducted back and forth through the segmented elastic layers and the viscoelastic layers, for an enhanced damping effect.

2. A tubular viscoelastic damping structure as defined in claim 1, wherein:

the first and second relatively stiff segmented elastic layers have segments that are staggered or overlapped with respect to each other, to divert dynamic loads back and forth between these two layers, through the intervening second viscoelastic layer.

3. A tubular viscoelastic damping structure as defined in claim 2, wherein:

each of the first and second viscoelastic layers is continuous.

4. A tubular viscoelastic damping structure as defined in claim 1, wherein:

the first and second viscoelastic layers are selected to have different transition temperatures, above which they provide substantially reduced stiffness, to provide increased damping efficiency over a broadened operative temperature range.

5. A tubular viscoelastic damping structure as defined in claim 4, wherein:

the first viscoelastic layer has a higher transition temperature than the second viscoelastic layer, to transfer load through the entire operative temperature range; and the second viscoelastic layer, having a lower transition temperature than the first, to dissipate vibrations at the lower end of the operative temperature range.

6. A tubular viscoelastic damping structure as defined in claim 5, wherein:

the first viscoelastic layer has a transition temperature of approximately 30° C. and the second viscoelastic layer has a transition temperature of approximately 0° C.

7. A method for fabricating a tubular viscoelastic damping structure, comprising the steps of:

forming a first viscoelastic layer over a tube of relatively soft elastic material;

forming a first segmented stiff elastic layer over the first viscoelastic layer;

forming a second viscoelastic layer over the first segmented stiff elastic layer; and forming a second segmented stiff elastic layer over the second viscoelastic layer;

whereby manufacturing is facilitated by not having to use a mandrel or a special technique to form a layer inside the tube.

8. A process for damping dynamic loads in a tubular viscoelastic structure including an inner tube of relatively soft elastic material, two segmented elastic layers of material of high stiffness and strength in a desired loading direction, formed outside the inner tube, and at least one continuous layer of viscoelastic material having low stiffness and strength in the desired loading direction, also formed outside the tube, the method comprising the steps of:

applying a dynamic load to the structure in the desired loading direction;

conducting the dynamic load forces generally in the direction of loading, and back and forth between the two segmented elastic layers and through the at least one layer of viscoelastic material;

dissipating dynamic load energy in the at least one viscoelastic layer material as a result of conducting the load forces repeatedly through the viscoelastic layer material; and providing at least one path for the conduction of static loads in the desired loading direction.

* * * * *